United States Patent
Camp, Jr. et al.

[11] Patent Number: 5,857,241
[45] Date of Patent: Jan. 12, 1999

[54] SOFT GRIP HANDLE

[75] Inventors: William P. Camp, Jr., Wooster; John S. Husted, Dalton; Dennis D. Humphrey, Wooster, all of Ohio

[73] Assignee: The Wooster Brush Company, Wooster, Ohio

[21] Appl. No.: 801,009

[22] Filed: Feb. 19, 1997

[51] Int. Cl.⁶ .................................................. A47B 95/02
[52] U.S. Cl. ................ 16/111 R; 16/114 R; 16/DIG. 12; 403/288; 15/230.11; 411/377
[58] Field of Search .................... 16/115, 114 R, 16/111 R, 116 R, 110.5, DIG. 12, DIG. 18, DIG. 19, DIG. 24, DIG. 25, DIG. 41; 403/288; 15/230.11, 143.1, 145; 81/177.1, 489, 490; 411/377, 431, 430, 375; 492/13, 14

[56] References Cited

U.S. PATENT DOCUMENTS

| | | | |
|---|---|---|---|
| Re. 34,194 | 3/1993 | Stowell et al. | 16/111 R |
| 2,426,315 | 8/1947 | Marick . | |
| 2,701,379 | 2/1955 | Balistreri . | |
| 2,871,899 | 2/1959 | Coyle et al. . | |
| 3,008,167 | 11/1961 | Pharris et al. | 15/230.11 |
| 3,462,202 | 8/1969 | Stoddart | 16/114 R |
| 3,716,433 | 2/1973 | Plummer | 16/110 R |
| 3,972,528 | 8/1976 | McCracken et al. . | |
| 4,285,096 | 8/1981 | Swaim | 16/114 R |
| 4,452,289 | 6/1984 | Smith . | |
| 4,887,950 | 12/1989 | Sakayori et al. | 411/431 |
| 4,969,268 | 11/1990 | Kelly, III . | |
| 5,107,590 | 4/1992 | Burout, III et al. . | |
| 5,134,008 | 7/1992 | Alm | 16/DIG. 12 |
| 5,226,198 | 7/1993 | Martin | 81/489 |
| 5,290,063 | 3/1994 | Lenhart | 16/DIG. 12 |
| 5,297,887 | 3/1994 | Williams | 15/145 |
| 5,327,612 | 7/1994 | Kelsay . | |
| 5,390,572 | 2/1995 | Gakhar et al. . | |
| 5,446,941 | 9/1995 | Kelsay . | |
| 5,502,864 | 4/1996 | Sorenson | 16/115 |
| 5,522,111 | 6/1996 | Kelsay et al. . | |

FOREIGN PATENT DOCUMENTS 2274615  8/1994  United Kingdom .

*Primary Examiner*—Chuck Y. Mah
*Attorney, Agent, or Firm*—Renner, Otto, Biosselle & Sklar, P.L.L.

[57] ABSTRACT

A handle for a paint roller frame includes an inner core made of a substantially rigid plastic material and an outer grip made of a softer rubber-like material surrounding the inner core and extending part way around both ends thereof. At the outer end of the inner core is an internally threaded opening surrounded by a planar end wall. The outer grip includes an outer end portion overlying the planar end wall which acts like a locking washer, resisting unscrewing of an extension pole from the threaded opening when the extension pole is screwed down tight and a flange at a base of the extension pole threads comes into contact with the outer end portion of the outer grip overlying the planar end wall.

20 Claims, 2 Drawing Sheets

SOFT GRIP HANDLE

FIELD OF THE INVENTION

This invention relates generally to a handle for a paint roller or other hand tool having an outer grip made of a soft rubber-like material.

BACKGROUND OF THE INVENTION

It is generally known to provide handles for different types of hand tools with an inner core of a substantially rigid plastic material to give the handle the required strength and rigidity for supporting the tool during use and an outer grip of a softer thermoplastic rubber-like material to give the handle a softer feel and more comfortable gripability. A common way of making such a handle is to overmold the outer grip onto the inner core. However, oftentimes the outer grip is only molded around portions of the inner core, leaving areas of the inner core exposed. This gives the undesirable appearance that the outer grip is a separate piece that is slid onto the inner core rather than integrally molded thereto. Indeed, if the material of the outer grip is not chemically compatible with the material of the inner core, or if the outer grip is not molded around the inner core at a sufficiently high temperature to cause a thermobond to take place between the outer grip and inner core, the outer grip may be susceptible to being pulled or peeled off the inner core.

It is also generally known to mold the outer grip completely around and into an opening in the outer end of the inner core to preclude any tendency of the outer grip from becoming dislodged laterally with respect to the inner core. However, this has the disadvantage that it does not permit a threaded opening to be provided in the outer end of the inner core for threaded engagement by an extension pole or the like.

SUMMARY OF THE INVENTION

The present invention relates to a handle for a paint roller or other hand tool which includes an inner core made of a substantially rigid plastic material and an outer grip made of a softer thermoplastic rubber-like material substantially completely covering the inner core.

In accordance with one aspect of the invention, the outer grip extends substantially the entire length of the inner core and part way around both ends of the inner core to securely retain the outer grip on the inner core.

In accordance with another aspect of the invention, the inner core includes a threaded opening in the outer end thereof surrounded by a planar end wall over which an end portion of the outer grip extends, acting as a locking washer, resisting unscrewing of an extension pole from the threaded opening when the extension pole is screwed down tight in the threaded opening and a flange at the base of the extension pole threads comes into contact with the end portion of the outer grip surrounding the threaded opening.

In accordance with another aspect of the invention, the handle is contoured to provide generally rounded top and bottom surfaces extending over substantially the entire length of the handle, with circumferentially extending ribs formed in the outer grip surrounding the rounded surfaces including rounded concave thumb rests adjacent the inner end of the handle to provide increased frictional contact when gripped by the user's hand.

In accordance with another aspect of the invention, the sides of the outer grip have substantially flat, smooth parallel surfaces for engagement by the palm and fingers of the user's hand.

In accordance with another aspect of the invention, relatively small recesses or indentations in the shape of a design or logo may be formed in the flat surfaces of the outer grip.

In accordance with another aspect of the invention, the recesses or indentations in the flat surfaces of the outer grip may extend all the way through the outer grip to expose corresponding flat surfaces of the inner core therebeneath which may be of a different color than the outer grip to provide a two-tone effect.

These and other aspects, advantages and features of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
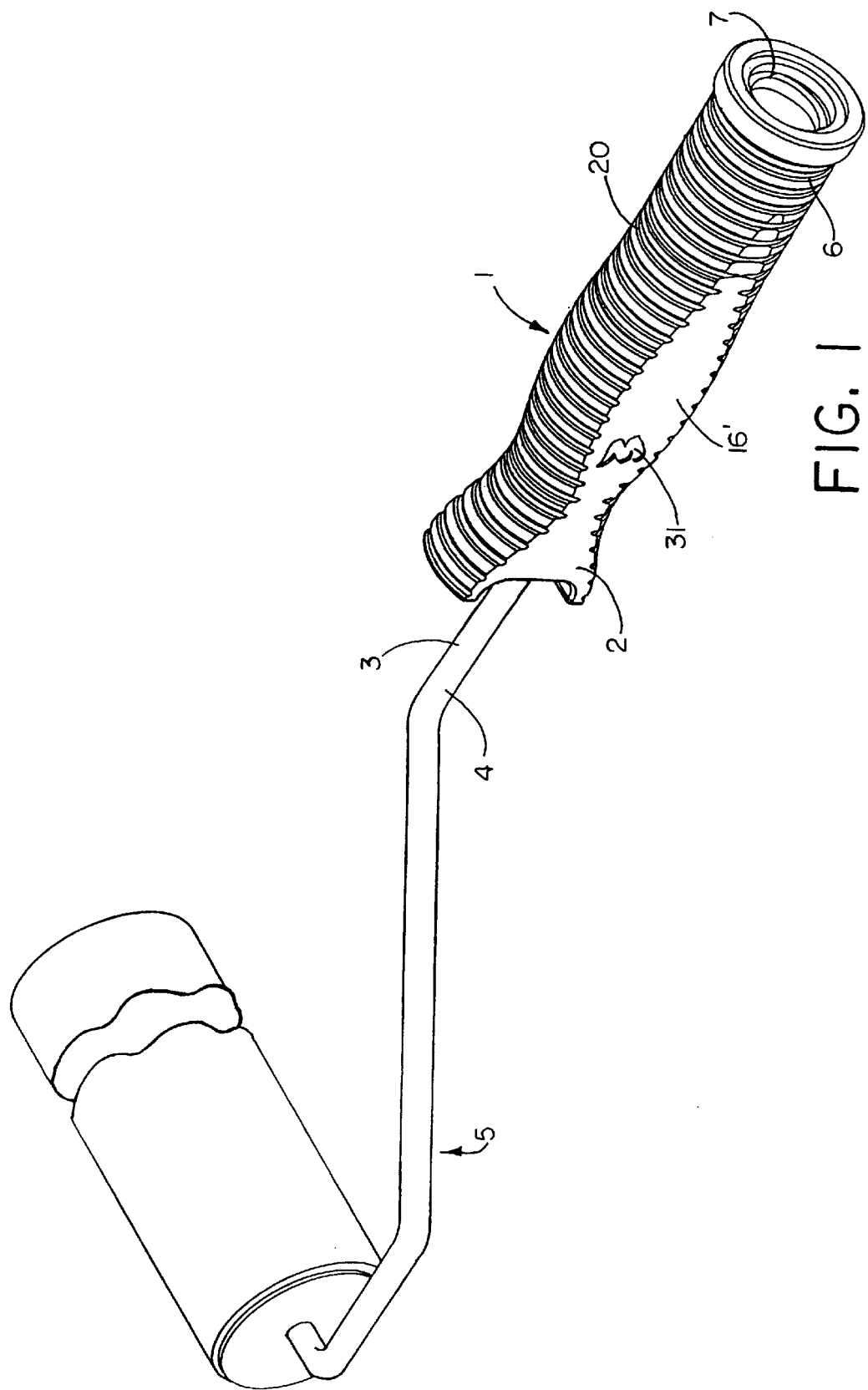
FIG. 1 is a perspective view of a paint roller frame including a soft grip handle made in accordance with the present invention.

Referring now in detail to the drawings, and initially to FIG. 1, a preferred form of handle 1 in accordance with this invention is shown with its inner end 2 press fitted onto the outer end 3 of a heavy gauge wire or shank 4 of a paint roller frame 5 or other hand tool. At the outer end 6 of the handle 1 is an internally threaded bore 7 to which the tip 8 of an extension pole 9 may be threadedly connected thereto (see FIG. 6).

Figure 3:
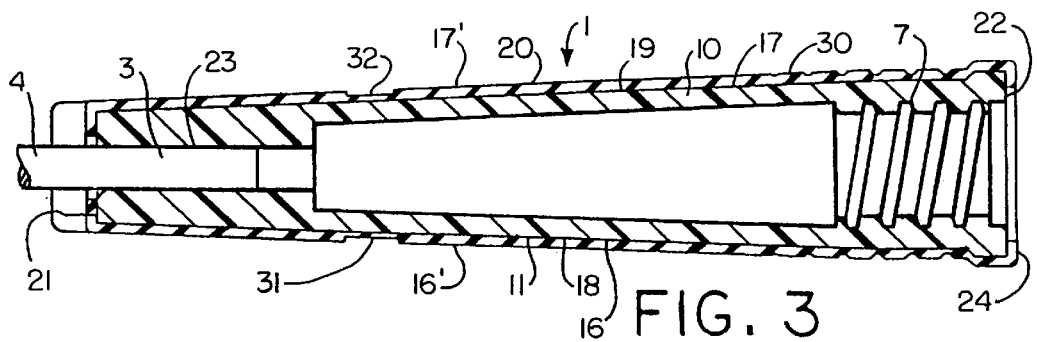
FIG. 3 is a longitudinal section through the handle of FIG. 2, taken generally on the plane of the line 3—3 thereof, showing relatively small recesses or indentations in the shape of a design or logo extending part way through the outer grip.
Figure 6:
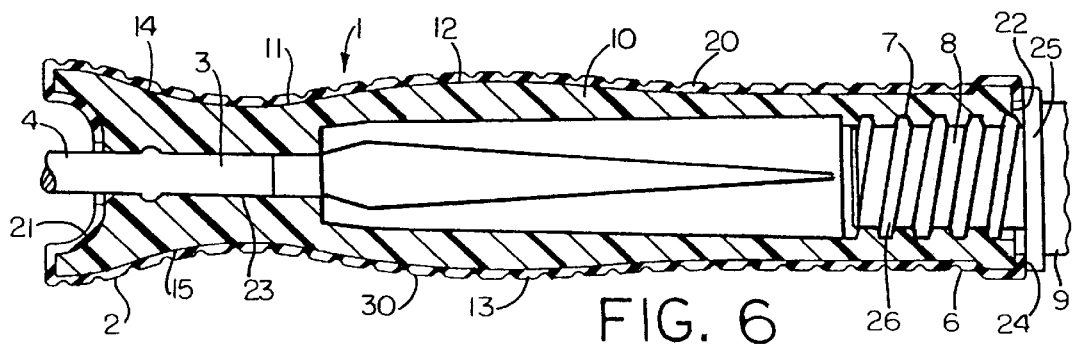
FIG. 6 is a longitudinal section through the handle of FIG. 5, taken generally on the plane of the line 5—5 thereof, and showing the tip of an extension pole threaded into the outer end of the handle.

As best seen in FIGS. 3 and 6, the handle 1 includes an inner core 10 molded out of a suitably rigid plastic material. If the tool is a paint applicator, the inner core 10 is preferably made of polypropylene or other thermoplastic material that will not degrade when exposed to paint solvents and the like. During the molding process, the internal threads 7 may be molded as an integral part of the inner core 10. Alternatively, a separate insert containing an internally threaded bore may be snap fitted into the premolded inner core, similar to U.S.

Pat. No. 5,288,161 assigned to the same assignee of the present application, the entire disclosure of which is incorporated herein by reference.

The inner core 10 has a substantially smooth uninterrupted outer surface 11 and is preferably formed into a suitable ergonomic shape including rounded top and bottom sides 12 and 13 extending substantially the entire length of the handle including rounded concave thumb rests 14 and 15 adjacent the inner end of the handle, and substantially flat parallel surfaces 16 and 17 on opposite sides 18 and 19 of the handle for easy engagement by the palm and fingers of the user's hand.

To provide the handle 1 with a softer feel and more comfortable gripability by the user's hand, an outer grip 20 of a relatively soft thermoplastic elastomer material made, for example, by Advanced Elastomers Corp. under the brand name/trademark SANTOPRENE, is overmolded around the inner core 10. The outer grip 20 extends substantially the entire length of the inner core 10 and part way around both end walls 21 and 22, leaving exposed the bore 23 in the inner end wall 21 in which the shank 4 of the tool frame 5 is press fitted and the threaded bore 7 in the planar outer end wall 22 in which the extension pole tip 8 is threaded. This has the advantage that the outer grip 20 will be securely retained on the inner core 10 without the need for a chemical bond therebetween. Thus, the outer grip 20 can be overmolded over the inner core 10 at lower temperatures and hence faster cycles than would otherwise be possible if a chemical bond had to be formed between the outer grip and inner core.

Another benefit in molding the outer grip 20 around the planar outer end wall 22 of the inner core 10 surrounding the threaded opening 7 is that the end portion 24 of the outer grip 20 overlying such planar outer end wall will act as a locking washer, resisting unscrewing of the extension pole 9 from the threaded opening when the extension pole is screwed down tight and a flange 25 at the base of the extension pole threads 26 comes into contact with the end portion 24 of the outer grip as schematically shown in FIG. 6.

The thickness of the outer grip 20 is desirably substantially uniform over substantially the entire length and at the ends of the inner core 10. However, during the overmolding process, thicker axially spaced, circumferentially extending ribs 30 are desirably formed in the outer grip 20 on the rounded surfaces of the handle 1 including the rounded top and bottom sides 12 and 13 and concave thumb rests 14 and 15 adjacent the inner end of the handle to provide increased frictional contact when gripped by the user's hand.

Figure 2:
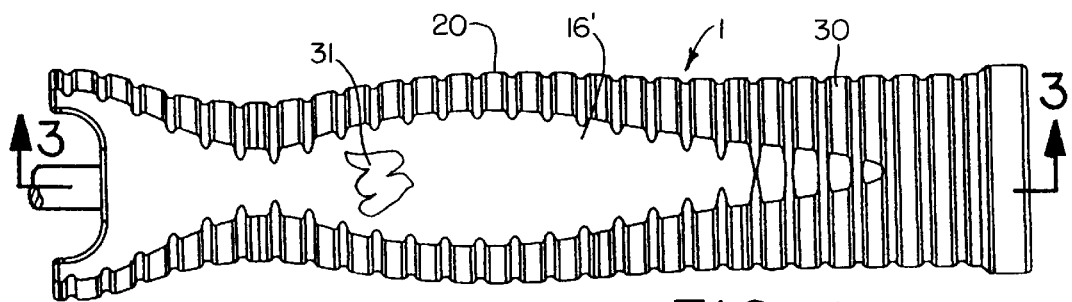
FIG. 2 is an enlarged side elevation view of the handle of FIG. 1.
Figure 4:
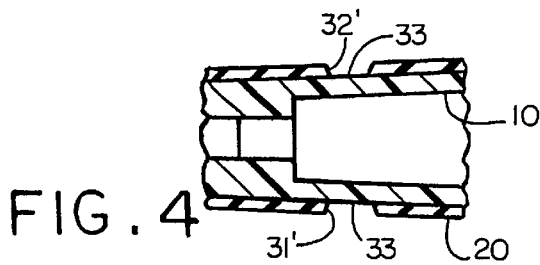
FIG. 4 is a fragmentary longitudinal section through the handle, similar to FIG. 3, but showing the recesses or indentations as comprising openings extending all the way through the outer grip, exposing the outer surface of the inner core therebeneath.
Figure 5:
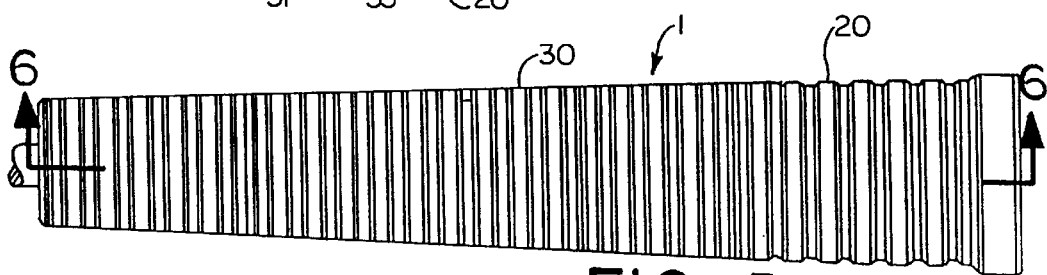
FIG. 5 is an enlarged top plan view of the handle of FIG. 1.

Also, relatively small recesses or indentations 31, 32 in the shape of a design or a logo may be formed in the flat external surfaces 16' and 17' of the outer grip 20 during the overmolding process. In FIGS. 2 and 3 the recesses or indentations 31, 32 are shown extending only part way through the outer grip 20, whereas in FIG. 4 the recesses or indentations 31', 32' are openings extending completely through the outer grip 20 to expose portions of the outer surface 33 of the inner core 10 therebeneath. Also, the inner core 10 may be made of a different color than the outer grip 20 to provide a two-tone effect where the outer surface 33 of the inner core 10 is exposed through the openings 31', 32' in the outer grip 20 as schematically illustrated in FIG. 4.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A handle for a paint roller frame or other hand tool comprising an inner core made of a substantially rigid plastic material, said core having an internally threaded opening at an outer end for threaded engagement by an extension pole, said internally threaded opening being surrounded by a planar end wall, and an outer grip made of a softer rubber-like material covering said inner core and including an outer end portion overlying said planar end wall to act as a locking washer, resisting unscrewing of the extension pole from said threaded opening when the extension pole is screwed down tight and a flange at a base of extension pole threads comes into contact with said outer end portion of said outer grip overlying said planar end wall.

2. The handle of claim 1 wherein said inner core has an inner end wall containing a bore in which a shank portion of the hand tool is received, said outer grip including an inner end portion overlying said inner end wall.

3. The handle of claim 1 which has contoured generally rounded top and bottom surfaces extending substantially the entire length of said handle, and axially spaced, circumferentially extending ribs formed in said outer grip on said rounded surfaces to provide increased frictional contact when gripped by a user's hand.

4. The handle of claim 3 further comprising rounded concave thumb rests adjacent an inner end of said handle, said thumb rests also including axially spaced, circumferentially extending ribs formed in said outer grip.

5. The handle of claim 1 further comprising substantially flat, smooth parallel surfaces on sides of said handle intermediate said rounded top and bottom surfaces for engagement by the palm and fingers of the user's hand.

6. The handle of claim 5 wherein said inner core has a substantially smooth, uninterrupted outer surface, and said outer grip has an exterior surface containing a relatively small recess or indentation in the shape of a design or logo that extends partway through said outer grip on one or both of said flat surfaces of said handle.

7. The handle of claim 5 wherein said inner core has a substantially smooth, uninterrupted outer surface, and said outer grip has an exterior surface containing a relatively small opening in the shape of a design or logo that extends completely through said outer grip on one or both of said flat surfaces of said handle to expose said outer surface of said inner core inwardly of said opening.

8. The handle of claim 7 wherein said inner core is of a different color than said outer grip to provide a two-tone effect where said outer surface of said inner core is visible through said opening in said outer grip.

9. The handle of claim 7 wherein the surface of said outer grip through which said opening extends and the underlying surface of said inner core exposed through said opening in said outer grip are substantially flat, smooth parallel surfaces.

10. The handle of claim 1 wherein said inner core has a substantially smooth, uninterrupted exterior surface, and said outer grip is formed with a plurality of axially spaced, circumferentially extending ribs along the axial extent of said handle to provide increased frictional contact when gripped by a user's hand.

11. The handle of claim 1 wherein said inner core is made of a thermoplastic material which is resistant to paint solvents.

12. The handle of claim 11 wherein said thermoplastic material is polypropylene.

13. The handle of claim 1 wherein said outer grip is made of a thermoplastic rubber.

14. In combination, a hand tool having a handle connected to said hand tool at one end of said handle, an internally threaded opening at another end of said handle surrounded by a planar end wall, and an extension pole having a threaded tip for threaded engagement in said threaded opening, said handle comprising an inner core made of a substantially rigid plastic material, and an outer grip made of a softer rubber-like material surrounding said inner core and including an outer end portion overlying said planar end wall to act as a locking washer, resisting unscrewing of said extension pole from said threaded opening when said extension pole is screwed down tight and a flange at a base of the extension pole threads comes into contact with said outer end portion of said outer grip overlying said planar end wall.

15. The combination of claim 14 wherein said outer grip also includes an inner end portion overlying one end of said inner core.

16. The combination of claim 15 wherein said inner core is made of a thermoplastic material, and said outer grip is made of a thermoplastic rubber-like material.

17. The combination of claim 14 wherein said handle has contoured generally rounded top and bottom surfaces extending substantially the entire length of said handle, and axially spaced, circumferentially extending ribs formed in said outer grip on said rounded surfaces to provide increased frictional contact when gripped by a user's hand.

18. The combination of claim 17 wherein said outer grip includes oppositely facing sides intermediate said rounded top and bottom surfaces having substantially flat smooth parallel surfaces for engagement by the palm and fingers of a user's hand.

19. A handle for a paint roller or other hand tool comprising an inner core made of a substantially rigid plastic material having an inner end adapted to be mounted on a hand tool and an outer end adapted to be attached to an extension pole, and an outer grip made of a softer rubber-like material surrounding said inner core and extending partway around both ends of said inner core.

20. The handle of claim 19 wherein said outer end of said inner core has an internally threaded opening surrounded by a planar end wall, said outer grip extending partway around said outer end overlying said planar end wall to act as a locking washer, resisting unscrewing of an extension pole from said threaded opening when the extension pole is screwed down tight and a flange at a base of the extension pole threads comes into contact with said outer end portion of said outer grip overlying said planar end wall.

* * * * *